(12) United States Patent
Wu et al.

(10) Patent No.: US 8,916,674 B2
(45) Date of Patent: Dec. 23, 2014

(54) METHOD FOR PREPARING TERPOLYMER OF POLY (DIPHENYL ETHER SULFONE) AND POLY (DIPHENYL SULFONE)

(75) Inventors: Zhongwen Wu, Guangzhou (CN); Rongtang Ma, Guangzhou (CN); Xiangbin Zeng, Guangzhou (CN)

(73) Assignee: Kingfa Sci & Tech Co., Ltd., Guangzhou (CN)

( * ) Notice: Subject to any disclaimer, the term of this patent is extended or adjusted under 35 U.S.C. 154(b) by 160 days.

(21) Appl. No.: 13/504,064

(22) PCT Filed: Dec. 10, 2010

(86) PCT No.: PCT/CN2010/002023
§ 371 (c)(1),
(2), (4) Date: Apr. 25, 2012

(87) PCT Pub. No.: WO2011/075942
PCT Pub. Date: Jun. 30, 2011

(65) Prior Publication Data
US 2012/0208977 A1    Aug. 16, 2012

(30) Foreign Application Priority Data
Dec. 23, 2009 (CN) .......................... 2009 1 0218086

(51) Int. Cl.
*C08G 75/00* (2006.01)
*C08G 75/23* (2006.01)

(52) U.S. Cl.
CPC ...................................... *C08G 75/23* (2013.01)
USPC ........... 528/373; 528/391; 528/171; 528/125; 528/295; 528/174

(58) Field of Classification Search
CPC ...................................................... C08G 75/23
USPC .......................... 528/391, 171, 295, 125, 174
See application file for complete search history.

(56) References Cited

U.S. PATENT DOCUMENTS

| 4,785,072 A | 11/1988 | Harris et al. | |
| 2012/0095182 A1* | 4/2012 | Wu et al. ....................... | 528/126 |

FOREIGN PATENT DOCUMENTS

| CN | 1844196 A | 10/2006 |
| CN | 1884330 A | 12/2006 |
| CN | 101544760 A | 9/2009 |
| CN | 101735459 A | 6/2010 |
| WO | 039538 A1 | 4/2007 |
| WO | 019239 A1 | 2/2009 |

* cited by examiner

*Primary Examiner* — Shane Fang
(74) *Attorney, Agent, or Firm* — Lucas & Mercanti, LLP; Peter J. Phillips

(57) ABSTRACT

A method for preparing series of terpolymer of poly (diphenyl ether sulfone) and poly (diphenyl ether diphenyl sulfone) comprises: adding high temperature organic solvent, stirring and heating; sequentially adding 4,4'-dihydroxydiphenyl, 4,4'-dichlorodiphenyl sulfone and 4,4'-Bis(4-chlorophenyl) sulfonyl-1,1'-biphenyl; after all the monomers are completely dissolved, heating to 100° C. and adding alkali metal carbonate salt-forming agent which is 5-10 mol % more than the amount of 4,4'-dihydroxydiphenyl added, and subsequently adding xylene; continuously heating and salt-forming reaction begins in the system, and controlling the temperature at 190~210° C.; then heating to 230~236° C., and maintaining for 3-4 hours to obtain polymer viscous liquid; and refining the polymer viscous liquid to obtain a terpolymer containing different structural units in the molecular chain, wherein the Tg of the terpolymer can be regulated by changing the ratio of the two dichloro-containing monomers.

6 Claims, No Drawings

METHOD FOR PREPARING TERPOLYMER OF POLY (DIPHENYL ETHER SULFONE) AND POLY (DIPHENYL SULFONE)

FIELD OF THE INVENTION

The present invention falls into the art of high-molecular materials, and in particular relates to a method for preparing series of terpolymer of poly (diphenyl ether sulfone) and poly (diphenyl ether diphenyl sulfone) in a set of production equipment using ternary polymerization technology.

BACKGROUND OF THE INVENTION

Poly (ether sulfone) is a special engineering plastic with exceptional comprehensive physical properties. Due to its comprehensive heat resistance (heat distortion temperature 200-220° C.), hydrolysis resistance (withstanding 150-160° C. hot water or vapor), creep resistance, dimensional stability, impact resistance, chemical resistance, non-toxicity, flame retardance, etc., it has been widely applied to such fields as electrics, electronics, machinery, automobile, hot water, medical apparatus and food processing. Its global production capacity has reached tens of thousands of tons, represented by Solvay Chemicals, Inc. However, over long-term application and extension, higher heat resistance requirements are being raised in different fields of application. In other words, there is a prevalent expectation for increasing its heat resistance grade from today's H to C while keeping its mechanical properties unchanged. It is driven by this market demand that we have completed the study of copolymers containing the diphenyl sulfone ether structure with a higher heat resistance grade on the basis of existing polysulfone patents, such as ZL200510017259.8, by first synthesizing monomers containing the diphenyl sulfone structure successfully using the principle of molecular design and ternary polymerization technology, and applied for the patent 200910217764.5. This patent has been completed by further completing the study of copolymers also containing the diphenyl sulfone ether structure with a higher heat resistance grade on the basis of the above patent.

SUMMARY OF THE INVENTION

The purpose of the present invention is to provide a method for preparing series of terpolymer of poly (diphenyl ether sulfone) and poly (diphenyl ether diphenyl sulfone) in a set of production equipment using ternary polymerization technology. The essence of the present invention is to add the following to the reaction system in the presence of heat resistant organic solvent:
(1) 4,4'-dihydroxydiphenyl $A_2$
(2) 4,4'-dichlorodiphenylsulfone $B_2$
(3) 4,4'-Bis(4-chlorophenyl)sulfonyl-1,1'-biphenyl $B_2'$ When the three monomers and the alkali carbonate salt-forming agent are mixed, a terpolymer whose molecular chain contains the following repeated unit structures can be obtained through a certain temperature rise procedure and after a certain hold time:

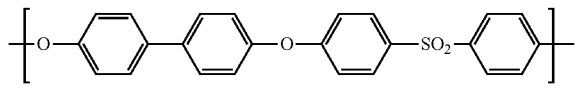

i.e., $A_2B_2$ chain segment I

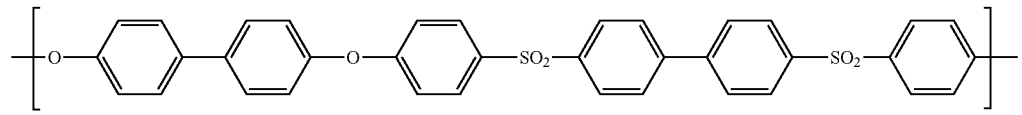

i.e., $A_2'B_2$ chain segment II

The method is implemented by adding high-temperature organic solvent to a three-neck flask provided with a thermometer, a nitrogen tube, a condensate water separator and a stirrer, adding 4,4'-dihydroxydiphenyl, 4,4'-dichlorodiphenyl sulfone and 4,4'-Bis(4-chlorophenyl)sulfonyl-1,1'-biphenyl in turn; after all monomers are dissolved, heating to 100° C. and adding alkali metal carbonate salt-forming agent which is 5-10 mol % more than the amount of 4,4'-dihydroxy diphenyl added, and then adding xylene; keeping heating so that the salt-forming reaction of the system begins, wherein the system temperature is controlled between 190° C. and 210° C., and the theoretical value achievement of water yield of the system represents the completion of the first-stage salt-forming reaction; at the moment, raising the system temperature to 230-236° C. and maintaining for 3-4 hours to complete polymerization to obtain a viscous polymer solution;

After the reaction stops, injecting the viscous polymer solution directly into distilled water at room temperature to obtain a strip solid; grinding the strip solid into powder and obtaining a solid powder containing a polymer, water-soluble solvent and salt through filtration; adding the solid powder to deionized water of 10 times its weight, boiling away for 1 hour, and removing the water-soluble solvent and salt through filtration; then boiling away the polymer-containing solid powder in the same way 8-10 times until the chloride ion content in the boiled filtrate as detected with silver nitrate is acceptable; and vacuum drying the resultant polymer powder until the moisture content by weight is less than 0.5%, when the desired terpolymer is obtained.

When the mixing ratio (namely mole number ratio) of the above two Type B monomers is:
(1) $B_2:B_2' \geq 99\%:1\%$ The content of chain segment I is ≥99% and that of chain segment II ≤1% in the resultant terpolymer, and the macroscopic physical properties of the terpolymer are equivalent to those of the poly (diphenyl ether sulfone) homopolymer shown below.

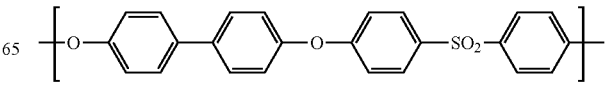

(2) $B_2:B_2' \leq 1\%:99\%$

The content of chain segment II is ≥99% and that of chain segment I ≤1% in the resultant terpolymer, and the macroscopic physical properties of the terpolymer are equivalent to those of the poly (diphenyl ether diphenyl sulfone) shown below.

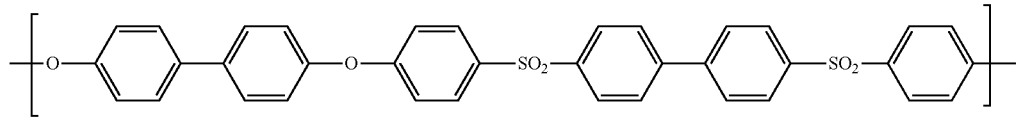

When the mixing ratio of the two Type B monomers is between the above two values, a variety of copolymers with different structural compositions, and heat resistance between that of poly (diphenyl ether sulfone) and that of poly (diphenyl ether diphenyl sulfone).

The solvent used here may be sulfolane or dimethyl sulfone, and the alkali carbonate used may be $Na_2CO_3$, $K_2CO_3$ or a mixture thereof.

A terpolymer with a different ratio of chain segment I to chain segment II in the molecular chain can be obtained by changing the mixing ratio of the two bi-chlorine monomers; its heat resistance is between that of poly (diphenyl ether sulfone) and that of poly (diphenyl ether diphenyl sulfone), and the Tg that indicates its heat resistance grade is freely adjustable between 220° C. and 268° C.

DETAILED DESCRIPTION OF THE INVENTION

Example 1

Add 504 g of sulfolane to a three-neck flask provided with a thermometer, a nitrogen tube, a condensate water separator and a stirrer, stir and heat, add 93.11 g (0.500 mol) of 4,4'-dihydroxydiphenyl, 142.87 g (0.4975 mol) of 4,4'-dichlorodiphenyl sulfone and 2.52 g (0.005 mol) of 4,4'-Bis(4-chlorophenyl)sulfonyl-1,1'-biphenyl in turn, keep stirring until all monomers are dissolved, heat to 100° C., and add 58.3 g (0.550 mol, 10 mol % more than 4,4'-dihydroxydiphenylsulfone) of $Na_2CO_3$ and then 80 ml of xylene to the system. Heating while stirring so that the salt-forming reaction of the system begins, wherein the water generated in the system co-boils with xylene, and cold fluid begins to drip from the condensate tube and stratify in the water separator. The system temperature is controlled between 200° C. and 210° C. When the supernatant xylene turns from turbid to clear and the amount of water collected is close to the theoretical value (9.0 ml), continue to recirculate for 20 minutes to ensure full salt-forming reaction, and then heat to 230-236° C. to start polymerization. Maintain a constant temperature for 3.5 hours to ensure full polymerization. Stop stirring; inject the viscous polymer solution directly into deionized water at room temperature to obtain a strip solid. After filtration, grind the strip solid into powder in a grinder. Add the filtered powder to deionized water and boil away for 1 hour. Repeat this 8-10 times until the chloride ion content in the water as detected with silver nitrate is acceptable.

Vacuum dry the filtered polymer until the moisture content by weight is less than 0.5%. Then a copolymer with a chain segment I to chain segment II ratio of 99%:1% will be obtained.

Its Tg of 220° C. as measured by DSC is equivalent to that of poly (diphenyl ether sulfone).

Example 2

Add 519 g of sulfolane, 93.11 g (0.500 mol) of 4,4'-dihydroxydiphenyl, 115.59 g (0.4025 mol) of 4,4'-dichlorodiphenyl sulfone, 50.34 g (0.100 mol) of 4,4'-Bis(4-chlorophenyl)sulfonyl-1,1'-biphenyl, 58.3 g (0.550 mol, 10% more than 4,4'-dihydroxydiphenyl) of $Na_2CO_3$ and 80 ml of xylene in the same order to a reactor identical with that used in Embodiment 1. Operate in the same way as Embodiment 1 in the other steps. A copolymer with a chain segment I to chain segment II ratio of 80%:20% will be obtained.

Its Tg is 231° C. as measured by DSC.

Example 3

Add 670 g of sulfolane, 93.11 g (0.50 mol) of 4,4'-dihydroxydiphenyl, 29.43 g (0.1025 mol) of 4,4'-dichlorodiphenyl sulfone, 201.36 g (0.400 mol) of 4,4'-Bis(4-chlorophenyl)sulfonyl-1,1'-biphenyl, 58.3 g (0.550 mol, 10% more) of $Na_2CO_3$ and 80 ml of xylene in the same order to a reactor identical with that used in Embodiment 1. Operate in the same way as Embodiment 1 in the other steps. A copolymer with a chain segment I to chain segment II ratio of 20%:80% will be obtained.

Its Tg is 259° C. as measured by DSC.

Example 4

Add 719 g of sulfolane, 93.11 g (0.500 mol) of 4,4'-dihydroxydiphenyl, 2.15 g (0.0075 mol) of 4,4'-dichlorodiphenyl sulfone, 249.19 g (0.495 mol) of 4,4'-Bis(4-chlorophenyl)sulfonyl-1,1'-biphenyl, 58.3 g (0.550 mol, 10% more) of $Na_2CO_3$ and 80 ml of xylene in the same order to a reactor identical with that used in Embodiment 1. Operate in the same way as Embodiment 1 in the other steps. A copolymer with a chain segment I to chain segment II ratio of 1.0%:99.0% will be obtained.

Its Tg is 268° C. as measured by DSC, the same as that of poly (diphenyl ether diphenyl sulfone).

What is claimed is:

1. A method for preparing terpolymer of poly (diphenyl ether sulfone) and poly (diphenyl ether diphenyl sulfone), the steps are as follows:
   (1) The method is implemented by adding high-temperature organic solvent to a three-neck flask provided with a thermometer, a nitrogen tube, a condensate water separator and a stirrer, adding 4,4'-dihydroxydiphenyl, 4,4'-dichlorodiphenyl sulfone and 4,4'-Bis(4-chlorophenyl)sulfonyl-1,1'-biphenyl in turn; after all monomers are dissolved, heating to 100° C. and adding alkali metal carbonate salt-forming agent which is 5-10 mol % more than the amount of 4,4'-dihydroxydiphenyl added, and then adding xylene; keeping heating so that the salt-forming reaction of the system begins, wherein the system temperature is controlled between 190° C. and 210° C., and the theoretical value achievement of water yield of the system represents the completion of the first-stage salt-forming reaction; at the moment, raising the system temperature to 230-236° C. and maintaining for 3-4 hours to complete polymerization to obtain a viscous polymer solution;
   (2) After the reaction stops, injecting the viscous polymer solution directly into distilled water at room temperature to obtain a strip solid; grinding the strip solid into powder and obtaining a solid powder containing a polymer, water-soluble solvent and salt through filtration; adding the solid powder to deionized water of 10 times its weight, boiling away for 1 hour, and removing the water-soluble solvent and salt through filtration; then boiling away the polymer-containing solid powder in the same way 8-10 times until the chloride ion content in the boiled filtrate as detected with silver nitrate is acceptable; vacuum drying the resultant polymer powder until the moisture content by weight is less than 0.5%, when a terpolymer containing chain segments I and II is obtained Chain segment I

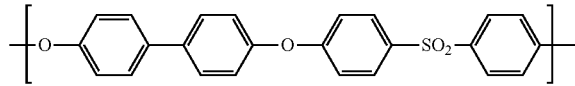

Chain segment II

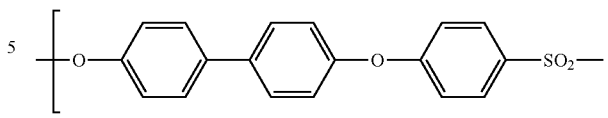

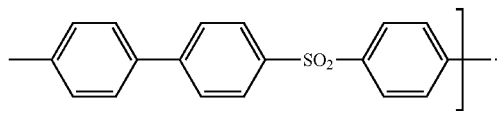

2. A method for preparing terpolymer of poly (diphenyl ether sulfone) and poly (diphenyl ether diphenyl sulfone) according to claim 1, wherein when the mole consumption ratio of 4,4'-dichlorodiphenyl sulfone to 4,4'-Bis(4-chlorophenyl)sulfonyl-1,1'-biphenyl is ≥99%:1%, the content of chain segment I is ≥99% and that of chain segment II ≤1% in the resultant terpolymer, and the macroscopic physical properties of the terpolymer are equivalent to those of the poly (diphenyl ether sulfone) homopolymer shown below:

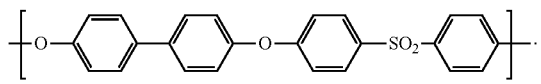

3. A method for preparing terpolymer of poly (diphenyl ether sulfone) and poly (diphenyl ether diphenyl sulfone) according to claim 1, wherein when the mole consumption ratio of 4,4'-dichlorodiphenyl sulfone to 4,4'-Bis(4-chlorophenyl)sulfonyl-1,1'-biphenyl is ≤1%:99%, the content of chain segment II is ≥99% and that of chain segment I ≤1% in the resultant terpolymer, and the macroscopic physical properties of the terpolymer are equivalent to those of the poly (diphenyl ether diphenyl sulfone) shown below:

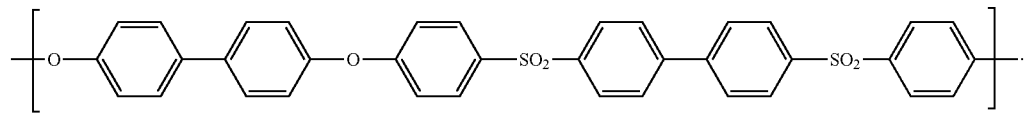

4. A method for preparing terpolymer of poly (diphenyl ether sulfone) and poly (diphenyl ether diphenyl sulfone) according to claim 1, wherein a terpolymer with a different ratio of chain segment I to chain segment II in the molecular chain can be obtained by changing the mixing ratio of 4,4'-dichlorodiphenyl sulfone to 4,4'-Bis(4-chlorophenyl)sulfonyl-1,1'-biphenyl; its heat resistance is between that of poly (diphenyl ether sulfone) and that of poly (diphenyl ether diphenyl sulfone), and the Tg that indicates its heat resistance grade is freely adjustable between 220° C. and 268° C.

5. A method for preparing terpolymer of poly (diphenyl ether sulfone) and poly (diphenyl ether diphenyl sulfone) according to claim 1, wherein the high-temperature organic solvent may be sulfolane or dimethyl sulfone.

6. A method for preparing terpolymer of poly (diphenyl ether sulfone) and poly (diphenyl ether diphenyl sulfone) according to claim 1, wherein the alkali carbonate used may be $Na_2CO_3$, $K_2CO_3$ or a mixture thereof.

* * * * *